United States Patent Office 2,784,875
Patented Mar. 12, 1957

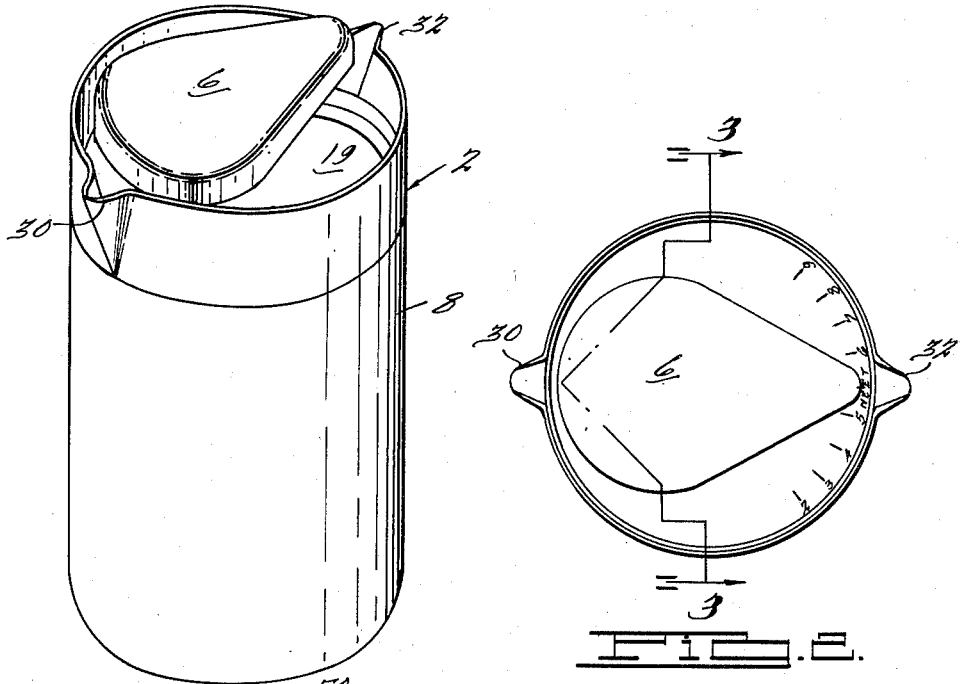

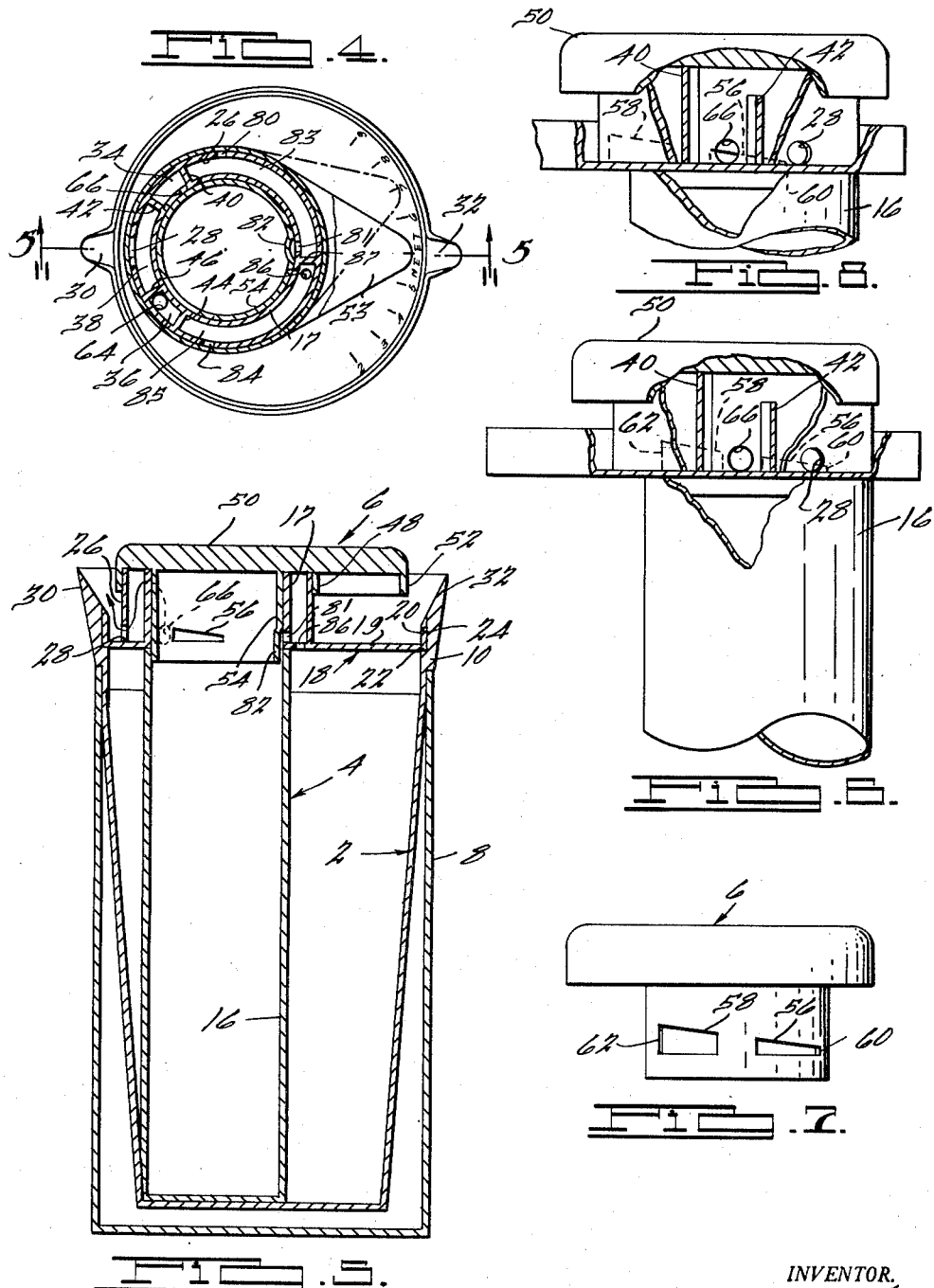

2,784,875

LIQUID DISPENSER

John E. Brink, Grosse Pointe, Mich.

Application July 28, 1955, Serial No. 524,978

8 Claims. (Cl. 222—42)

The present invention relates to a liquid dispenser and more particularly to a liquid dispenser of the type which is adapted to dispense a mixture of two liquids in predetermined relative proportions.

The principal object of the present invention is to provide a unitary liquid dispenser which is capable of dispensing a mixture of two different fluids in predetermined relative proportions while maintaining the two liquids in separate and individual containers.

Another object of this invention is to provide a fluid dispenser or cannister of the type comprising two separate containers, one positioned within the other, having means for instantaneously admixing and dispensing predetermined relative proportions of the liquid contained in each of the two containers, and which is easily disassembled for refilling and cleaning.

Another object is the provision of a fluid dispenser having two separate containers, means for instantaneously admixing and dispensing predetermined relative proportions of the liquids from each container, and means for preventing contamination of the individual liquids with the mixed liquid.

A further object of this invention is to provide a liquid dispenser or cannister which is capable of maintaining two separate liquids in a conventional sized and conventional appearing cannister and dispensing a desired mixture of the liquids and which is inexpensive, easy to manufacture and can be satisfactorily fabricated from readily available, inexpensive materials.

Other objects and advantageous features of this invention will become apparent upon considering the following detailed description of the invention in its entirety.

In the drawings:

Figure 1 is a perspective view of the assembled cannister or fluid dispenser of this invention;

Figure 2 is a top plan view of the cannister of this invention;

Figure 3 is a vertical sectional view taken along the line 3—3 of Fig. 2;

Figure 4 is a top plan view with parts broken away and parts in section showing the construction of the metering means carried by the small container;

Figure 5 is a vertical sectional view taken along the line 5—5 of Fig. 4;

Figure 6 is a side view with parts in section and parts broken away illustrating the relative positions of the parts of metering means when the metering means indicator is positioned in the Neet position as illustrated in Fig. 4 in solid lines;

Figure 7 is a side view of the cap portion of the metering means; and

Figure 8 is a side view with parts broken away and parts in section illustrating the relative position of the parts of the metering means when the metering means indicator is in position 7 as shown in dotted lines in Figure 4.

The fluid dispenser of this invention is particularly adapted for the dispensing of beverages which require the admixture of two separate ingredients, such, for example, as the cocktails known as a Martini and a Manhattan, etc. The fluid dispenser consists generally of a large container and a small container positioned inside the large container with means closing the large and small containers and for metering the flow of fluids from one or both containers in predetermined relative proportions and means for dispensing those mixed fluids. The large container is adapted for holding the majority ingredient of the mixed fluid to be dispensed and the small container is adapted to hold the minority ingredient. The metering means comprises generally a plurality of compartments positioned atop the member which closes the large container which lie outside and surround the outer wall of the small container. These compartments are in communication with the interior of the large container and the interior of the small container in such a manner that the fluid which emerges from the large container and the small container into the separate compartments are thereafter admixed in a mixing compartment before being dispensed from the container per se.

The container is also provided with means for maintaining the large container in a cool condition, and for preventing mixed liquids from contaminating the separate liquids.

Referring now in greater detail to the drawings and particularly to Figures 1, 4 and 5, it may be seen that the fluid dispenser of this invention comprises a large container generally designated 2, a small container generally designated 4, and a metering cap means generally designated 6. As illustrated herein, the large container 2 is generally frusto-conical in shape while the small container 4 is cylindrical. Large container 2 is provided with an upper wall portion 10 and a lower wall portion 12 which are separated by an annular shoulder 14. Shoulder 14 serves as the support for large container 2 on the upper edge of a surrounding jacket 8 which is mounted in pressure engagement with large container 2 by merely slipping container 2 inside jacket 8, so that it may be disengaged easily from large container 2 and filled with water, ice, or other cooling material, or may be left empty to define an air space around container 2 which will serve to maintain the temperature of the ingredients in large container 2 and small container 4. It is to be understood that the particular shape of large container 2, small container 4 and jacket 8 are illustrative only and that the cannister may have any other shape which is felt to be desirable such as a square or a polygon. Because of the rotational features of the metering cap means 6 it is preferable that the small container 4 be round in cross-section at least at its upper extremity.

The fluid dispenser of this invention may be fabricated from any of a wide variety of materials. The only requirements are that the material chosen be relatively inexpensive, capable of withstanding changes of temperature normally encountered in the refrigeration of liquids, be durable and relatively easy to fabricate. A particularly satisfactory material which has been successfully employed is polyethylene. This material is advantageous for the purposes of this invention because of its characteristics of forming air-tight and liquid-tight seals between adjacent surfaces in pressed relationship. A variety of other plastic materials which are conventionally available, or metal or rubber, etc., could be satisfactorily employed if desired.

As may best be seen in Figs. 4 and 5, small container 4 consists of a lower cylindrical portion 16 and an integral large container closure means generally designated 18 which is mounted on and carried by the upper end portion 17 of small container 4. The large container closure means 18 consists of a disc portion 19 which surrounds the outside wall of the upper end 17 of small container 4 and which terminates at its edges in an upwardly extending flange portion 20 which is adapted to be received on annular ledge 22 carried by the upper wall portion 10 of large container 2. The outside surface of flange portion 20 is in press-fit relationship with the wall surface 24 of upper wall portion 10 such that a liquid-tight seal is achieved between the large container 2 and the small container 4 by merely positioning the small container 4 and its integral closure means 18 inside large container 2. Large container closure means 18 is provided with a circular wall 26 which extends upwardly from disc 19, is somewhat larger in diameter than the diameter of small container 4 and is concentric with small container 4. As may be seen in Fig. 4, wall 26 is provided with an aperture 28 which is positioned immediately above the level of the flat portion 19 of large container closure means 18 and as seen in Fig. 4 is disposed immediately opposite the pouring spout 30 which is carried by the upper wall portion 10 of large container 2. Directly opposite from spout 30, or 180 degrees removed from spout 30, is another spout 32 which is provided for a purpose to be described later. The annular area which is defined by upstanding wall 26 and the upper wall 17 of small container 4 is compartmented into a plurality of compartments 34, 36, 38, 83, and 85 by means of a plurality of vertical partition panels or baffles which extend between the inner surface of wall 26 and the outer surface of wall 17 of small container 4. Compartment 34 is defined by baffles 40 and 42 while compartment 36 is defined by baffles 44 and 46. Compartment 83 is defined by baffles 40 and 87 while compartment 85 is defined by baffles 44 and 87. Upstanding wall 26 serves the further function of providing a bearing surface for guiding metering cap means 6 as it is rotated. For this purpose cap 6 is provided with a downwardly extending circular flange 48 which lies in close fit relationship with the outer surface of upstanding wall 26.

Metering cap means generally designated 6 consists of an upper flat plate portion 50 which is generally in the shape of a tear-drop. The large end of metering cap 6 is provided with previously referred to downwardly depending circular flange 48 and a smaller diameter, circular downwardly extending flange 54 which fits inside the wall portions 17 of small container 4 in press-fit relationship. The small end of cap means 6 is provided with a downwardly depending flange portion 52 which serves to provide rigidity to the extended small end portion 53 so that rotation of the metering cap 6 can be controlled by pressure applied to the small end 53. As may be seen in Fig. 4, the upper surface of large container closure means 18 is provided with a series of graduations numbered from 2 to 9 with the position lying on the diameter of the large container 2 and bisecting spouts 30 and 32 being labelled "Neet." The functions of these various positions will be explained hereinafter in connection with the operation of the dispenser. From Fig. 7 it may be seen that flange 54 is provided in its peripheral surface with an elongated slot, partially visible in Fig. 5, which is divided into two portions 56 and 58. Portions 56 and 58 are separated on the periphery of flange 54 a distance at least as great as the diametral width of the opening in the upper end portion of the wall of small container 4 for a purpose to be hereinafter described. It will be observed that the portions 56, 58 in the circumferential wall of flange 54 have an upper surface which is tapered gradually from the small end 60 to the large end 62.

The instantaneous proportioning of the liquids from the small container 4 and the large container 2 is accomplished as the result of the location of the exit apertures in these containers which communicate with the compartments 34, 36 and 38 and the cooperative functioning of metering cap 6. Large container 2 is provided with an aperture 64 as may be seen in Fig. 3 which is positioned in the flat portion 19 of large container closure means 18 within compartment 36, see Fig. 4. Small container 4 is provided with an aperture 66 in its upper end portion 17 which is positioned above the flat portion 19 of large container closure means 18 and this aperture is disposed so as to be in communication with compartment 34, see Fig. 4. It will be apparent that the relative size of apertures 64 and 66 may be controlled as desired and for use in connection with the admixing of the cocktails Martini or Manhattan, aperture 64 may conveniently be twice the size of aperture 66.

When the fluid dispenser is tilted toward pouring spout 30 fluid within large container 2 is free to flow through aperture 64 into compartment 36 and fluid in small container 4 may be free to flow through aperture 66 into compartment 34. The flow of fluid through aperture 66 and into compartment 34 is, of course, subject to the metered control of metering cap 6, and the rate of flow of the fluids through aperture 66 will be dependent upon the position of the slotted portions 56, 58 relative to aperture 66. When the large end portion 62 of portion 58 overlies aperture 66 the full flow through aperture 66 is possible, and as the metering cap 6 is rotated to bring the small end of slot 56 into overlying relationship with aperture 66, the flow of fluid through aperture 66 is restricted or decreased and thus rendered controllable relative to the flow from the large container through aperture 64. With the fluid dispenser tilted toward spout 30 as fluid flows through apertures 64 and 66, compartments 36 and 34, respectively, become filled and the fluid flows toward compartment 38 over the separating baffles 46 and 42, respectively, which, as may be seen in Fig. 3, terminate below the lower level of the flat portion 50 of metering cap 6. As the fluid flows over baffles 42 and 46 into compartment 38 it does so adjacent to the top of the compartment 38 and impinges against the lower surface of cap 6 and the upper end portion of upstanding wall 26. Before the fluid escapes from compartment 38 it must reverse its direction and move downwardly to the level of aperture 28 which is immediately above the level of the flat portion 19 of large container closure means 18. During this reversal of direction the mixing of the two fluids is accomplished. Baffles 42 and 46 serve the additional function of preventing the back-flow of mixed fluids from compartment 38 to either compartment 34 or 36 after the fluid dispenser is tilted back into its vertical position. It is, of course, undesirable for the ingredients in small container 4 or large container 2 to become contaminated with the mixed fluids from compartment 38 inasmuch as it is sometimes desirable to dispense the pure ingredient from either container.

Fig. 6 illustrates the relative location of metering cap 6 and the aperture 66 when it is desired to dispense only the fluid from large container 2. As shown, metering cap 6 is positioned so that its small end 53 is in the position labelled "Neet." With the cap 6 thus positioned, aperture 66 is positioned in the space between parts 56 and 58 of the slot in the flange 54. No fluid therefore flows from small container 4 through aperture 66 and fluid flows only from the large container 2 into compartment 36, then into compartment 38 and out through aperture 28 and spout 30. When it is desired to dispense a liquid from the minority container only it is necessary to empty the large container 2 and place liquid in small container 4 only and then set metering cap 6 so that its small end lies opposite the position labelled "No. 2" on the upper surface of the large container closure means 18. The dispenser, in this case, functions efficiently in maintaining the temperature of the liquid in container 4, because of the double insulating effects of container 2 and jacket 8.

When the metering cap 6 is in the position shown in dotted lines in Fig. 4 the approximate relationship between the slots 56, 58 in flange 54 and the aperture 66 is as illustrated in Fig. 8. In Fig. 8 it may be seen that the smaller portion 56 of the slot overlies aperture 66 and the area which is open for fluid to pass through is such that the relative proportions of fluid from the large and small containers is seven parts of the large container fluid to one part of the small container fluid. As illustrated slots 56, 58 are sized such that the relative proportions of the fluid which passes through aperture 66 is in inverse proportion to the numbers carried on disk portion 19 of closure member 18. For example, when the small end of metering cap 6 is opposite #2 the relative proportion of fluids which flow into mixing compartment 38 is two parts from the large container to one part from the small container, and when the small end of the metering cap 6 is opposite the numeral 4 the fluid is dispensed in the ratio of four parts from the large container to one part from the small container. It will thus be apparent that it is possible to obtain any relative proportion of the fluid from the large container and the small container which is desired by merely positioning metering member 6 opposite the desired relative proportion. Inasmuch as the limiting conditions are determined by the initial sizes of the apertures 64 and 66, it will be apparent that it is possible to utilize the structure of the present invention to obtain any desired range of relatively proportions of the two liquids.

To secure even, steady and continuous flow from either the large or small container, or both, it is necessary to include a means of introducing air into each container to replace the dispensed liquid or liquids. For container 2, air entry into compartment 85 is allowed through port 84 which is located in wall 26 below the lower extremity of flange 48, above the surface of disc portion 19 and adjacent to baffle 44. The air which thus enters compartment 85 feeds into the interior of container 2 through port 86 which is located adjacent to the baffle 87 in disc portion 19. For small container 4, air entry into compartment 83 is allowed through port 80 which is located in wall 26 below the lower extremity of flange 48, above the surface of disc portion 19 and adjacent to baffle 40. The air which thus enters compartment 83 feeds into the interior of container 4 through port 81 which is in wall portion 17 and located adjacent to baffle 87. The lower end of downwardly extending flange 54 is provided with an inwardly protruding relief portion 82 which overlies port 81 and extends circumferentially around the lower end of flange 54 for an angular distance slightly greater than the angle included in the rotation of cap 6 between the positions 2 and 9, or for an angle of 110°–140°. Under the normal slight tilting angle of the dispenser toward spout 30 and because of the hydrostatic pressure difference which exists between small container ports 66 and 81 as well as between large container ports 64 and 84, no liquid flow will occur from the port 81 or 86 when the dispenser is tilted for pouring from the spout 30.

For most efficient operation, aperture 28 should be of sufficient size so as to promote uniform flow of the combined liquids from compartment 38. Its size is properly determined by the initial sizes of the apertures 64 and 66, and in general should in all cases be larger than either of apertures 64 or 66.

The fluid dispenser of this invention is fabricated from the three basic parts, namely, large container 2, small container 4 and metering cap 6, and may also include an outside jacket 8. Large container 2 and metering cap 6 are extremely simple in shape and may be readily fabricated from a material such as polyethylene.

It is also feasible to fabricate small container 4 together with integral large container closure means 18 in one piece by casting or molding the same in a manner well known to those skilled in the art.

For the purpose of refilling small container 4 and large container 2 it is merely necessary to lift small container 4 together with large container closure means 18 from the large container and to thereafter disengage metering cap 6. With the parts so disassembled it is also relatively easy to clean the separate parts. In reassembling the parts care should be taken to observe the location of aperture 28 and to position the same opposite spout 30 so that the compartments 36 and 34 are positioned in the correct position to maintain the accuracy of the calibrated fluid flow controlled by the position of the small end 53 of the metering cap 6 as above explained.

Spout 32 is provided for the purpose of enabling the removal of any mixed fluid which remains in compartment 38 after the fluid dispenser is returned to its upright position. When the instantaneous proportioning and fluid dispensing is occurring some fluid may become trapped between the upper portion of upstanding wall 26 and the lower surface 50 of metering cap 6 in compartment 38 and this fluid will come to rest upon the top of the surface of disc 19 within compartment 38 as the fluid dispenser is returned to its upright position. By slightly tilting the fluid dispenser so that this fluid will flow out through aperture 28 and on to the open surface of disc 19 it is then possible to reverse the direction of tilting of the fluid dispenser and to remove this excess fluid through spout 32 without simultaneously introducing any additional fluid into compartments 34 and 36, or 38. When, however, the dispenser is tilted for pouring from spout 32 some flow will occur from ports 81 and 86. Any liquid which flows through port 81 or 86 is separately received and retained in compartments 83, 85, respectively. Since the draining from spout 32 is normally a momentary one, the volume capacities of compartments 83 and 85 are adequate for the control of any liquid which flows from the large and small containers 2, 4. Liquids which accumulate in compartments 83, 85, during draining, flow back to their respective containers 2 and 4 through ports 81 and 86 when the dispenser is returned to its upright position.

What is claimed is:

1. A fluid dispenser comprising a large container, a small container positioned in said large container, large container closure means integral with said small container removably closing said large container at a position below the top of said large container, a first means carried by said large container closure means for receiving liquid from said large container, second means carried by said large container closure means for receiving liquid from said small container, third means carried by said closure means for receiving liquid from said first and said second means, and means separating said third means from said first and second means such that liquid does not pass from said third means to said first and second means when said dispenser is in an upright position, outlet means carried by said third means, and metering means closing the top of said first, second and third means and for regulating the flow of liquid into said second means.

2. A fluid dispenser for metering two fluids in controlled relative proportions comprising a large container, a small container positioned in said large container, large container closure means integral with said small container removably closing said large container at a position below the top of said large container, a first compartment communicating with said large container, a second compartment communicating with said small container, and a third compartment communicating with said first and said second compartments, all said compartments being carried by said closure means, outlet means carried by said third compartment, and metering means positioned in said minority container for regulating the flow from said container to said second compartment.

3. A fluid dispenser as claimed in claim 1 wherein said first, second and third means are arcuate compartments defined by the outer surface of the upper end of the wall of said small container and a surrounding wall radially spaced from said upper end of said small container and a plurality of vertically disposed baffles extending between said surrounding wall and the outer surface of the upper end of said small container, the baffles separating said third means from said first and said second means terminating beneath the lower surface of said metering means.

4. A fluid dispenser as claimed in claim 3 wherein said third compartment is disposed between said first and said second compartment and said outlet means is disposed immediately above the level of said large container closure means.

5. A fluid dispenser as claimed in claim 3 wherein the side wall of said large container above the level of said large container closure means is provided with a first spout opposite said outlet in said third means and a second spout 180 degrees removed from said first spout.

6. A fluid dispenser as claimed in claim 3 wherein the communication between said first compartment and said large container is an aperture in said large container closure means disposed within said compartment and the communication between said third compartment and said small container is an aperture in the upper end of the wall of said small container disposed above the level of said large container closure means.

7. A fluid dispenser as claimed in claim 2 wherein the communication between said first compartment and said large container is an aperture in said large container closure means disposed within said compartment and the communication between said second compartment and said small container is an aperture in the upper end of the wall of said small container disposed above the level of said large container closure means, and said metering means comprises a depending circular flange in contact with the inner surface of the upper end wall of said small container, said flange having an elongated slot therein, said slot increasing in width from one end toward the other and disposed so as to overlap said aperture as said metering means is rotated relative to said small container.

8. A fluid dispenser comprising a large container, a small container positioned in said large container, large container closure means integral with said small container removably closing said large container below the top of said large container, first means carried by said large container closure means for receiving liquid from said large container, second means carried by said large container closure means for receiving liquid from said small container, third means carried by said large container closure means for receiving liquid from said first and said second means, and means separating said third means from said first and second means such that liquid does not pass from said third means to said first and second means when said dispenser is in a vertical position, outlet means carried by said third means, metering means closing the top of said first, second and third means for regulating the flow of liquid into said second means, said metering means consisting of an upper surface portion in contact with the top surface of said first, second and third means, having a depending flange in contact with the inner surface of the upper end wall of said small container, said flange having an elongated slot therein in overlying relationship with the means communicating said second compartment and said small container, said slot increasing in width from one end toward the other and being divided into two parts, the said two parts being spaced from each other.

No references cited.